United States Patent
Inha et al.

(10) Patent No.: US 11,138,807 B1
(45) Date of Patent: Oct. 5, 2021

(54) DETECTION OF TEST OBJECT FOR VIRTUAL SUPERIMPOSITION

(71) Applicant: Varjo Technologies Oy, Helsinki (FI)

(72) Inventors: Kai Inha, Järvenpää (FI); Ari Antti Erik Peuhkurinen, Helsinki (FI); Mikko Ollila, Tampere (FI); Roope Rainisto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/207,167

(22) Filed: Mar. 19, 2021

(51) Int. Cl.
| | |
|---|---|
| *G06T 19/00* | (2011.01) |
| *G06T 19/20* | (2011.01) |
| *G06K 9/00* | (2006.01) |
| *G02B 27/01* | (2006.01) |

(52) U.S. Cl.
CPC ........ *G06T 19/006* (2013.01); *G06K 9/00335* (2013.01); *G06K 9/00664* (2013.01); *G06T 19/20* (2013.01); *G02B 27/0172* (2013.01); *G06T 2219/2016* (2013.01)

(58) Field of Classification Search
CPC ............. G06T 19/006; G06T 19/20; G06T 2219/2016; G06K 9/0335; G02B 27/0172
See application file for complete search history.

(56) References Cited

U.S. PATENT DOCUMENTS

| | | | | |
|---|---|---|---|---|
| 2016/0012644 | A1* | 1/2016 | Lam | G06T 19/006 |
| | | | | 345/419 |
| 2017/0337493 | A1* | 11/2017 | Paramasivan | G16H 40/20 |
| 2019/0122439 | A1* | 4/2019 | Thiebaud | G06F 3/1423 |
| 2020/0364482 | A1* | 11/2020 | Bradski | G06K 9/4671 |

* cited by examiner

*Primary Examiner* — Robert J Craddock
(74) *Attorney, Agent, or Firm* — Ziegler IP Law Group, LLC

(57) ABSTRACT

A system for producing extended-reality images for a display apparatus. The system includes camera(s) and processor communicably coupled to camera(s), wherein processor is configured to: control camera(s) to capture image(s) representing test object present in real-world environment, wherein test object is physically covered three-dimensionally with coded pattern; obtain information pertaining to three-dimensional geometry of coded pattern; analyze image(s) to identify first image segment representing part of coded pattern visible in image(s); determine virtual content to be presented for test object, based on said part of coded pattern; process image(s) to generate extended-reality image(s) in which virtual content is virtually superimposed over said part of the coded pattern, based on information pertaining to three-dimensional geometry of coded pattern.

18 Claims, 5 Drawing Sheets

DETECTION OF TEST OBJECT FOR VIRTUAL SUPERIMPOSITION

TECHNICAL FIELD

The present disclosure relates to systems for producing extended-reality images for display apparatuses, said systems facilitating detection of test objects for virtual superimposition. The present disclosure also relates to methods for producing extended-reality images for display apparatuses, said methods facilitating detection of test objects for virtual superimposition.

BACKGROUND

In recent times, immersive extended-reality (XR) technologies such as virtual-reality (VR), augmented-reality (AR), mixed-reality (MR) are being employed in various fields such as consumer research, entertainment, real estate, training, medical imaging operations, simulators, navigation, and the like. Such immersive XR technologies create immersive XR environments for presentation to a user of an XR device (such as an XR headset, a pair of XR glasses, or similar).

In order to produce XR images, real-world content of a real-world environment where the user is present, and virtual content (i.e. computer generated content) are utilized. Presently in use for obtaining the real-world content are systems that employ camera(s) for capturing images of the real-world environment. These images are then processed for superimposing the virtual content thereon.

However, existing systems have several problems associated therewith. The existing systems are inefficient in terms of accurately detecting (namely, identifying) real-world objects present in the real-world environment, using the captured images. It is challenging, using the existing systems, to properly detect boundaries, orientation, deformation, and the like, of the real-world objects. Resultantly, virtual superimposition of virtual content for the object is inaccurate and unrealistic, as the virtual content is improperly mapped onto a surface of the real-world object that is visible in the captured images. As an example, the virtual content may be mapped in a manner that the virtual content does not follow a requisite boundary, orientation, deformation, and the like, of the real-world object. In such a case, the XR images produced are sub-optimal. This leads to a poor viewing experience involving lack of realism, lack of immersion, and abstractedness for the user, within the XR environment constituted by such sub-optimal XR images.

Therefore, in light of the foregoing discussion, there exists a need to overcome the aforementioned drawbacks associated with the existing systems for producing the XR images.

SUMMARY

The present disclosure seeks to provide a system for producing extended-reality images for a display apparatus. The present disclosure also seeks to provide a method for producing extended-reality images for a display apparatus. An aim of the present disclosure is to provide a solution that overcomes at least partially the problems encountered in prior art.

In one aspect, an embodiment of the present disclosure provides a system for producing extended-reality images for a display apparatus, the system comprising at least one camera and a processor communicably coupled to the at least one camera, wherein the processor is configured to:

control the at least one camera to capture at least one image representing a test object present in a real-world environment, wherein the test object is physically covered three-dimensionally with a coded pattern;

obtain information pertaining to a three-dimensional geometry of the coded pattern covering the test object;

analyze the at least one image to identify a first image segment representing a part of the coded pattern that is visible in the at least one image;

determine virtual content to be presented for the test object, based on the part of the coded pattern that is visible in the at least one image; and process the at least one image to generate at least one extended-reality image in which the virtual content is virtually superimposed over the part of the coded pattern represented in the first image segment, based on the information pertaining to the three-dimensional geometry of the coded pattern.

In another aspect, an embodiment of the present disclosure provides a method for producing extended-reality images for a display apparatus, the method comprising:

controlling at least one camera to capture at least one image representing a test object present in a real-world environment, wherein the test object is physically covered three-dimensionally with a coded pattern;

obtaining information pertaining to a three-dimensional geometry of the coded pattern covering the test object;

analyzing the at least one image to identify a first image segment representing a part of the coded pattern that is visible in the at least one image;

determining virtual content to be presented for the test object, based on the part of the coded pattern that is visible in the at least one image; and processing the at least one image to generate at least one extended-reality image in which the virtual content is virtually superimposed over the part of the coded pattern represented in the first image segment, based on the information pertaining to the three-dimensional geometry of the coded pattern.

Embodiments of the present disclosure substantially eliminate or at least partially address the aforementioned problems in the prior art, and enable accurate detection of test object (in captured images) for virtual superimposition of virtual content thereon, to produce highly accurate and realistic extended-reality images for a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2A illustrates an exemplary first image, while

FIG. 3A illustrates an exemplary second image, while

FIG. 4A illustrates an exemplary third image, while

Figure 1:
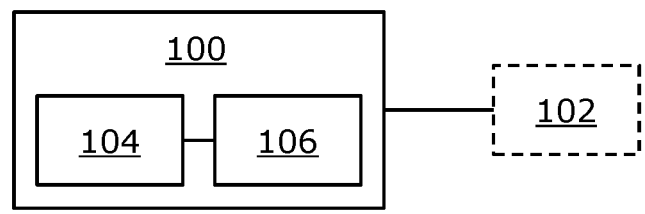
FIG. 1 illustrates a block diagram of architecture of a system for producing extended-reality images for a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for producing extended-reality images for a display apparatus, the system comprising at least one camera and a processor communicably coupled to the at least one camera, wherein the processor is configured to:

control the at least one camera to capture at least one image representing a test object present in a real-world environment, wherein the test object is physically covered three-dimensionally with a coded pattern;

obtain information pertaining to a three-dimensional geometry of the coded pattern covering the test object;

analyze the at least one image to identify a first image segment representing a part of the coded pattern that is visible in the at least one image;

determine virtual content to be presented for the test object, based on the part of the coded pattern that is visible in the at least one image; and process the at least one image to generate at least one extended-reality image in which the virtual content is virtually superimposed over the part of the coded pattern represented in the first image segment, based on the information pertaining to the three-dimensional geometry of the coded pattern.

In another aspect, an embodiment of the present disclosure provides a method for producing extended-reality images for a display apparatus, the method comprising:

controlling at least one camera to capture at least one image representing a test object present in a real-world environment, wherein the test object is physically covered three-dimensionally with a coded pattern;

obtaining information pertaining to a three-dimensional geometry of the coded pattern covering the test object;

analyzing the at least one image to identify a first image segment representing a part of the coded pattern that is visible in the at least one image;

determining virtual content to be presented for the test object, based on the part of the coded pattern that is visible in the at least one image; and processing the at least one image to generate at least one extended-reality image in which the virtual content is virtually superimposed over the part of the coded pattern represented in the first image segment, based on the information pertaining to the three-dimensional geometry of the coded pattern.

The present disclosure provides the aforementioned system and the aforementioned method for producing extended-reality (XR) images for a display apparatus. Herein, the test object present in the real-world environment is physically covered three-dimensionally with the coded pattern, prior to capturing the at least one image representing the test object. Such a coded pattern covering the test object is easily and accurately detectable in the at least one image. Resultantly, boundaries, orientation, deformation, and the like, of the test object that is visible in the at least one image is/are accurately and precisely determined by the processor. This enables the processor to accurately determine a requisite virtual content to be presented onto surface(s) of the test object that is/are visible in the at least one image. Moreover, the virtual content is modified according to the three-dimensional geometry of the coded pattern for realistic three-dimensional virtual superimposition of the virtual content upon the test object. In such a case, the virtual content is not just merely visually superimposed over the part of the coded pattern, but is adjusted (namely, altered or mapped) to fit according to the three-dimensional geometry of the coded pattern in a manner that said virtual superimposition appears seamless and realistic. As an example, the virtual content may be virtually superimposed in a manner that the virtual content follows a requisite boundary, orientation and deformation of the surface(s) of the test object. As a result, the at least one XR image is optimally (i.e. realistically and accurately) generated from the at least one image in real-time (without any latency). Therefore, when a user of the display apparatus views the at least one XR image, the user experiences realism and immersiveness within an XR environment. The method is fast, reliable and can be implemented with ease. Moreover, the manner of generating XR images described herein can also be employed in cases where more than one test objects are present in the real-world environment. As an example, the user may conveniently handle two different test objects (having different virtual content superimposed thereon) simultaneously in the XR environment for comparison with respect to each other.

The system comprises specialized equipment for capturing the at least one image representing the test object present in the real-world environment, and then processing the at least one image to gather information about the test object present in the real-world environment, which is then used to produce the at least one extended-reality (XR) image for the display apparatus. It will be appreciated that the system produces the at least one XR image for the display apparatus in real time or near-real time. Then, the at least one XR image is communicated from the system to the display apparatus. The at least one XR image is to be presented to a user of the display apparatus. Herein, the term "extended-reality" encompasses virtual reality (VR), augmented reality (AR), mixed reality (MR), and the like.

Throughout the present disclosure, the term "display apparatus" refers to a specialized equipment that is configured to present an XR environment to the user when the display apparatus, in operation, is used by the user. It will be appreciated that the display apparatus is worn by the user on his/her head. The display apparatus is implemented, for example, as an XR headset, a pair of XR glasses, and the like, that is operable to display a visual scene of the XR environment to the user.

Commonly, the "display apparatus" may be referred to as "head-mounted display (HMD)", for the sake of convenience only.

In some implementations, the system is integrated with the display apparatus. In such implementations, the system is physically coupled to the display apparatus (for example, attached via mechanical and electrical connections to components of the display apparatus). Optionally, in such implementations, the processor of the system serves as a processor of the display apparatus. Alternatively, optionally, in such implementations, the processor of the system is communicably coupled to a processor of the display apparatus.

In other implementations, the system is implemented on a remote device that is separate from the display apparatus. In such implementations, the processor of the system and a processor of the display apparatus are communicably coupled, wirelessly and/or in a wired manner. Optionally, the system is mounted on the remote device. Examples of the remote device include, but are not limited to, a drone, a vehicle, and a robot. Optionally, the remote device is physically positioned at the real-world environment, whereas the user of the display apparatus is positioned away from (for example, at a distance from) the remote device.

The at least one camera captures the at least one image representing the test object present in the real-world environment. It will be appreciated that typically, a natural source of light and/or an artificial source of light would be present in the real-world environment.

Optionally, the at least one camera is implemented as at least one visible light camera. Examples of a given visible light camera include, but are not limited to, a Red-Green-Blue-Depth (RGB), monochrome camera. It will be appreciated that a given camera could be implemented as a combination of the given visible light camera and a depth camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. For example, the given camera may be implemented as the stereo camera.

It will be appreciated that the processor is communicably coupled to the at least one camera wirelessly and/or in a wired manner. The processor is configured to control the operation of the aforementioned system. The processor may be understood to be a compositor (namely, a processing unit that is configured to perform at least compositing tasks pertaining to presentation of the XR environment). The compositor is a software module taking various inputs (such as the at least one image and the virtual content) and composing (namely, building or generating) the at least one XR image to be displayed at the display apparatus.

It will be appreciated that the at least one image that is captured via the at least one camera may depict at least a part of the test object. Throughout the present disclosure, the term "test object" refers to a three-dimensional (3D) object present in the real-world environment. Such a 3D object is under test and investigation required for design and development in various fields such as consumer research, training, engineering, and the like. It will be appreciated that an entire surface of the test object is physically covered (namely, wrapped) three-dimensionally with the coded pattern. It is to be understood that physically covering the test object with the coded pattern is a manual operation, that is performed prior to the processing operations of the processor. In an example, the test object may be a beverage can (such as a soft-drink can, a beer can, and the like), a garment (such as a t-shirt, a jeans, a shirt, a sweater, and the like), a gadget (such as a cellphone, a camera, a watch, and the like), a bottle (such as a water bottle, a syrup bottle, and the like), a pack of items (such as a pack of candies, a pack of nuts, a pack of pencils, a pack of cereal, and the like), a vehicle prototype, and the like.

Throughout the present disclosure, the term "coded pattern" refers to a pattern of a plurality of uniquely coded markers that represent a high number of detectable features. Moreover, descriptors of these features are highly discriminative, so as to enable distinct features to be accurately identified as being distinct from one another. It will be appreciated that the coded pattern is detectable by the at least one camera in a two-dimensional (2D) and/or in a 3D setting of the test object. Optionally, the coded pattern is visible in a natural light (i.e. visible light) or in an infrared (IR) light.

Optionally, the processor is further configured to:

generate a plurality of pattern images having different sizes using at least one reference pattern;

resize the plurality of pattern images in a manner that upon resizing, the plurality of pattern images have a same size and correspond to different scales of the at least one reference pattern; and join the plurality of pattern images to generate the coded pattern.

Throughout the present disclosure, the term "pattern image" refers to an image that is generated from a reference image which represents the at least one reference pattern. The plurality of pattern images collectively constitute the coded pattern. Herein, the term "reference image" refers to an image which represents the at least one reference pattern, while the term "reference pattern" refers to a pattern that represents a high number of detectable features. Optionally, the at least one reference pattern comprises at least one of: a noise pattern, a barcode pattern, a Quick Response (QR) code pattern, a Just Another Bar (JAB) code pattern. It will be appreciated that typically the noise pattern, the barcode pattern, the QR code pattern are 2D black-and-white code patterns, while the JAB pattern is a 2D colour code pattern. It will be appreciated that the reference image may or may not be processed, by the processor, to generate the plurality of pattern images. When the reference image is processed to generate the plurality of pattern images, the processor could employ at least one of: an image cropping operation, an image brightening operation, an image rotating operation, an image sharpening operation, an image smoothing operation, an image resizing operation, an image colour-change operation, an image merging operation, an image slicing operation, and the like.

In an example, a given reference pattern may be a QR code pattern, and a given pattern image may be an image of the QR code pattern. In another example, a given reference pattern may be a noise pattern, and a given pattern image may be a noise image of the noise pattern. The noise pattern could be one of: a blue noise pattern, a white noise pattern, a Perlin noise pattern, a Gaussian noise pattern, or similar.

Optionally, the different scales of the at least one reference pattern lie in a range of 1.5-3 times of a scale of the at least one reference pattern. It will be appreciated that the different scales of the at least one reference pattern represent detectable features at different scales. Beneficially, in such a case, the coded pattern thus generated has the high number of detectable features (and at different scales). Moreover, the coded pattern is generated in a manner that the detectable features are accurately detected by the at least one camera even with varying distances of the at least one camera from the test object. As an example, the plurality of pattern images may be high-frequency grayscale noise images having a same size and corresponding to different scales of a given reference pattern. Then, when the at least one camera is located far away from the test object, each pattern image is accurately detected as a grayscale image (and not a purely gray image) by the at least one camera owing to use of the different scales of the given reference pattern. Beneficially, this potentially eliminates blurring effect which would have been produced without using the different scales of the given reference pattern.

In an example, the processor may be configured to generate 3 pattern images A1, A2, and A3 having 3 different sizes using a QR code pattern. The 3 pattern images A1-A3 would be resized to a same size, wherein the pattern images A1, A2, and A3 may correspond to scales C1, C2, and C3 of the QR code pattern, respectively. Then, the 3 pattern images A1-A3 are joined to generate the coded pattern, which is used to physically cover the test object three-dimensionally.

It will be appreciated that the aforesaid manner of generating the coded pattern emulates key point detection at various scales, that is employed in computer vision techniques such as Scale-invariant feature transform (SIFT) and/or Speeded up robust features (SURF) techniques.

Optionally, the information pertaining to the 3D geometry of the coded pattern covering the test object comprises at least one of: a shape of the coded pattern covering the test object, a size of the coded pattern covering the test object, a form of the coded pattern covering the test object. The form of the coded pattern can be a given deformation of the coded pattern, a given reformation of the coded pattern, and the like. It will be appreciated that since the test object is physically covered three-dimensionally with the coded pattern, a 3D geometry of the test object is same as the 3D geometry of the coded pattern covering the test object.

Optionally, the processor is configured to extract the 3D geometry of the coded pattern by processing the at least one image that represents the test object. Optionally, in this regard, the processor employs photogrammetry for processing the at least one image to generate a photogrammetric model of the coded pattern. The photogrammetric model provides a realistic estimation of the 3D geometry of the coded pattern covering the test object, based on 3D measurements of the test objects that are extracted from the at least one image. Optionally, the photogrammetric model of the coded pattern comprises information indicative of at least one of: an optical depth of the coded pattern with respect to the at least one camera, features of the coded pattern, physical shape of coded pattern, form of the coded pattern, size of the coded pattern, material properties of the coded pattern or its portions, information regarding lights and lighting conditions (such as brightness, darkness, shadowing, and the like) within the real-world environment.

Alternatively or additionally, optionally, the processor is configured to obtain the 3D geometry of the coded pattern covering the test object from a data repository. Herein, the term "data repository" refers to hardware, software, firmware, or a combination of these for storing at least information pertaining to 3D geometries of a plurality of test objects, in an organized (namely, structured) manner, thereby, allowing for easy storage, access (namely, retrieval), and updating of said information. As an example, the data repository may store information pertaining to 3D geometries of several items (such as, the beverage can, the garment, and the like) that conform to a standard. When the test object is, for example, the beverage can, a known 3D geometry of the beverage can may be extracted from the data repository as the information pertaining to the 3D geometry of the coded pattern. It will be appreciated that the processor is communicably coupled to the data repository wirelessly or in a wired manner.

Notably, at a given time instant, only some part of the coded pattern would be visible in the at least one image (as the at least one image is 2D and the coded pattern is 3D). Therefore, the processor analyzes the at least one image to identify a region in the at least one image wherein the part of the coded pattern is visible. This region is the first image segment. It will be appreciated that the plurality of uniquely coded markers allows for determining an exact area of the part of the coded pattern that is visible in the at least one image. The first image segment comprises a group of pixels representing the part of the coded pattern that is visible in the at least one image. It will be appreciated that the first image segment may be a continuous image segment (i.e. all pixels of the group are located together in the at least one image) or a discontinuous image segment (i.e. sub-groups of the pixels of the group are located disjointly in the at least one image).

Optionally, when analyzing the at least one image to identify the first image segment, the processor is configured to:

extract a plurality of first features from the at least one image;

extract a plurality of second features from at least one reference image representing at least one reference pattern, wherein the coded pattern is generated using the at least one reference pattern; and match the plurality of first features with the plurality of second features to detect the coded pattern in the at least one image.

Optionally, a given feature comprises a key point and a descriptor, wherein the key point is a location of the given feature in the given image and the descriptor is an image gradient corresponding to the given feature point. Optionally, the plurality of second features are extracted from one or more of the plurality of reference images that correspond to the different scales of the at least one reference pattern.

Optionally, the processor is configured to employ at least one image processing algorithm when analysing the at least one image. Examples of the at least one image processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like), a feature matching algorithm.

Typically, standard techniques (such as the SIFT, the SURF, the ORB, or similar) are employed for feature detection and feature matching, wherein a plurality of features (that are detected from both a first image and a second image) are matched according to a descriptor similarity.

Optionally, when matching the plurality of first features with the plurality of second features to detect the coded pattern in the at least one image, pixels values of pixels representing the plurality of first features are compared with pixel values of pixels representing the plurality of second features. In such a case, the first image segment is identified to be that region of the at least one image where the pixel values of pixels representing the plurality of first features are same as the pixel values of pixels representing the plurality of second features.

It will be appreciated that optionally matching of the plurality of first features with the plurality of second features to detect the coded pattern in the at least one image is performed according to descriptor similarities of the plurality of first features and the plurality of second features. Optionally, in this regard, the processor is configured to perform a distance-ratio check for matching the pluralities of first and second features. When performing the distance ratio check, the processor is configured to compute a given distance ratio as a distance between a first feature and a second feature that is a closest match of the first feature, divided by a distance between the first feature and another second feature that is a second-closest match of the first feature. In such a case, the first feature is matched with the second feature when a magnitude of the given distance ratio lies within a predefined threshold of distance ratio. Optionally, the step of determining the distance-ratio employs at least one mathematical formula. The distance-ratio check is well-known in the art.

Optionally, different surfaces of the test object are covered with different types of the coded pattern that are generated using different reference images representing different reference patterns,
wherein, when analyzing the at least one image to identify the first image segment, the processor is configured to:
  detect at least one type of the coded pattern that is visible in the at least one image; and
  determine at least one surface of the test object that is visible in the at least one image, based on the at least one type of the coded pattern.

Optionally, when detecting the at least one type of the coded pattern that is visible in the at least one image, the processor is configured to compare the reference image with the at least one image. In such a case, the at least one reference pattern (represented in the reference image) is matched with the coded pattern that is visible in the at least one image to detect which type(s) of the coded pattern is/are visible in the at least one image.

Optionally, the at least one surface of the test object that is visible in the at least one image is determined based on the at least one type of the coded pattern that is detected to be visible in the at least one image. As the processor optionally generates the coded pattern, which type of coded pattern will be used to cover which surface of the test object is optionally pre-known to the processor. Therefore, once the processor detects which type(s) of the coded pattern is/are visible in the at least one image, the processor accurately determines which surface(s) of the test object is/are visible in the at least one image. It will be appreciated that a given surface of the test object that is visible in the at least one image may be partially-visible or fully visible.

As an example, the test object may be a pack of candies, wherein a front surface of the pack is physically covered with the barcode pattern, while a back surface of the pack is physically covered with the QR code pattern. In one case, only one type of the coded pattern, such as the barcode pattern, may be visible in the at least one image. Therefore, the processor may determine that the front surface of the pack is visible in the at least one image. In another case, both types of the coded pattern, such as the barcode pattern and the QR code pattern, may be visible in the at least one image. Therefore, the processor may determine that both the front and back surfaces of the pack are visible in the at least one image. This case may occur when the pack of candies is deformable so that some parts of both its front and back surfaces are visible in the at least one image.

Notably, the virtual content to be presented for the test object is determined based on at least one of: an area of the part of the coded pattern that is visible in the at least one image, the at least one surface of the test object corresponding to the part of the coded pattern that is visible in the at least one image. The term "virtual content" refers to computer-generated content. Optionally, the virtual content is indicative of at least one of: a type of the test object, a brand of the test object, a packaging of the test object, an image of the test object, composition or parts of the test object, directions of use of the test object. Examples of the virtual content include, but are not limited to, a virtual image, a virtual text, a virtual information. As an example, the virtual content to be presented for a front surface of a pack of nuts may be a type of nuts, a brand of nuts, and an image nuts, while the virtual content to be presented for a back surface of a pack of nuts may be nutritional information of nuts.

Notably, when the virtual content is virtually superimposed over the part of the coded pattern visible in the first image segment, based on the information pertaining to the 3D geometry of the coded pattern, the virtual content is modified according to the 3D geometry of the coded pattern for realistic 3D virtual superimposition of the virtual content. In such a case, the virtual content is not just merely visually superimposed over the part of the coded pattern, but is also geometrically adjusted (namely, altered or mapped) to fit over the part of the coded pattern according to the 3D geometry of the coded pattern in a manner that said virtual superimposition appears seamless and realistic. As an example, the at least one image represents the test object that may be a beer can. Herein, the virtual content is virtually superimposed over the part of the coded pattern (covered over a cylindrical surface of the test object) in a manner that the virtual content is geometrically adjusted to fit over the part of the coded pattern according to a cylindrical geometry of the coded pattern. One such exemplary scenario has been illustrated in conjunction with FIGS. 2A and 2B, as described below.

Optionally, the processor of the HMD is configured to display the at least one XR image via at least one display or projector. Examples of a given display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, the at least one XR image is projected onto a projection screen or directly onto a retina of the user's eyes. Examples of a given projector include, but are not limited to, an LCD-based projector, an LED-based projector, an OLED-based projector, an LCoS-based projector, a Digital Light Processing (DLP)-based projector, and a laser projector.

Optionally, the processor is further configured to create a three-dimensional data representation of the test object indicative of at least one of: the three-dimensional geometry of the coded pattern, a pose of the coded pattern, using the at least one image, wherein when processing the at least one image to generate the at least one extended-reality image, the processor is configured to utilize the three-dimensional data representation of the test object for realistic three-dimensional virtual superimposition of the virtual content.

Optionally, when creating the 3D data representation of the test object is created using the at least one image, the processor is configured to employ at least one image processing technique. The at least one image processing technique is optionally at least one of: an image stitching technique, an image merging technique, an image combining technique, an image layering technique, an image blending technique, or similar. The term "three-dimensional data representation" refers to a 3D data format that is used to represent 3D structure and/or pose of the test object. Optionally, the 3D data representation is one of: a 3D point cloud model, a 3D triangular mesh model, a 3D quadrilateral mesh model, a voxel-based model, a parametric model, a depth map-based model. The pose of the coded pattern encompasses a position of the coded pattern and/or an orientation of the coded pattern. The position of the coded pattern and/or the orientation of the coded pattern are visible in the at least one image. Optionally, the processor utilizes the photogrammetric model of the coded pattern, when creating the 3D data representation of the test object. In an example, when using the 3D point cloud model, a smooth mesh reconstruction could be performed by detection of boundary points of the test object and a fast-Fourier transform (FFT) based edge reconstruction.

It will also be appreciated that using the 3D data representation of the test object, the 3D geometry of the coded pattern and/or the pose of the coded pattern is/are precisely and accurately known to the processor. Therefore, the processor optionally adjusts (or maps) the virtual content over the part of the coded pattern according to the 3D geometry of the coded pattern and/or the pose of the coded pattern in a manner the virtual superimposition appears seamless and realistic. The superimposed virtual content accurately conforms to the 3D geometry of the coded pattern and/or the pose of the coded pattern.

Optionally, the processor is further configured to:
analyze the at least one image to identify a second image segment representing a part of a user's body; and
determine a relative arrangement of the first image segment and the second image segment in the at least one image, wherein, when processing the at least one image to generate the at least one extended-reality image, the processor is configured to:
modify the virtual content to be virtually superimposed, based on the relative arrangement of the first image segment and the second image segment; and
replace the first image segment with the modified virtual content.

Optionally, when analyzing the at least one image to identify the second image segment, the processor is configured to:

extract the plurality of first features from the at least one image;
extract a plurality of third features from at least one user image representing at least one part of the user's body; and
match the plurality of first features with the plurality of third features to detect the part of the user's body in the at least one image.

Examples of the part of the user's body include, but are not limited to, a hand of the user, finger(s) of the user, an arm of the user, a leg of the user.

Optionally, when determining the relative arrangement of the first image segment and the second image segment in the at least one image, a position and an orientation of the test object (particularly, a position and an orientation of the part of the coded pattern) is identified with respect to a position and an orientation of the part of the user's body when the part of the user's body handles the test object. The relative arrangement indicates how the part of the user's body handles the test object (for example, holds the test object without occluding any portion of its surface, holds the test object and occludes some portion of its surface, grips the test object, deforms the test object, wraps the test object around itself, and so on). In a first example, a given portion of the coded pattern may be occluded when the user's hand holds the test object (such as a beverage can) by keeping his/her thumb on the given portion. The determined relative arrangement of first and second image segments may be that the second image segment is adjacent to the first image segment, and the first image segment is arranged discontinuously about the second image segment. One such exemplary scenario has been illustrated in conjunction with FIGS. 3A and 3B, as described below. In a second example, the user's hand may deform (for example, by pressing) the test object (for example, a deformable test object, such as a pack of nuts) from a left side of the test object. The determined relative arrangement of first and second image segments may be that the second image segment is adjacent to a left side of the first image segment, and the first image segment is arranged continuously about the second image segment. One such exemplary scenario has been illustrated in conjunction with FIGS. 4A and 4B, as described below.

The processor is optionally configured to modify the virtual content to be virtually superimposed upon the first image segment according to such handling of the test object by the part of the user's body in a manner that upon the virtual superimposition, the part of the user's body is precisely and accurately located (with respect to the test object) in the at least one XR image.

Optionally, the processor is configured to employ at least one image-adjustment algorithm when modifying the virtual content to be virtually superimposed. Optionally, in this regard, the at least one image processing algorithm is at least one of: an image cropping algorithm, an image rotating algorithm, an image sharpening algorithm, an image smoothing algorithm, an image blurring algorithm, an image resizing algorithm, an image orientation algorithm, an image colour-change algorithm, an image merging algorithm, an image slicing algorithm, an image layering algorithm, an image blending algorithm, an image special-effects algorithm. Referring to the first example, a part of the virtual content that was to be superimposed upon the given portion of the coded pattern may be removed, as that part of the virtual content would be occluded by the part of the user's body if it were present on the test object in reality. The modified virtual content would then be used to replace the first image segment, when generating the at least one XR image. Referring to the second example, a given portion of the coded pattern may get exposed to a shadow of the user's hand when the user's hand reforms the test object. In such a case, a part of the virtual content that was to be superimposed upon the given portion of the coded pattern may be darkened (to resemble the shadow), as that part of the virtual content would be shaded (or darkened) by the user's hand if it were present on the test object in reality. The modified virtual content would then be used to replace the first image segment, when generating the at least one XR image.

It will be appreciated that when the virtual content is modified and replaced in the aforesaid manner to generate the at least one XR image, the user of the display apparatus would have a natural touch-and-feel interaction experience within the XR environment while handling the test object.

Optionally, the processor is further configured to:

select a plurality of sub-segments within the first image segment;

analyze the at least one image to determine pixel values of pixels within the plurality of sub-segments;

estimate lighting conditions in the real-world environment by comparing the pixel values of the pixels within the plurality of sub-segments with reference pixel values of corresponding pixels within the reference image, wherein the reference image represents the reference pattern that is used to generate the coded pattern; and generate a lighting model of the real-world environment using the estimated lighting conditions in the real-world environment, wherein, when processing the at least one image to generate the at least one extended-reality image, the processor is configured to utilize the lighting model for photorealistically lighting the virtual content, prior to virtual superimposition.

Optionally, a given sub-segment comprises a single pixel or a plurality of pixels. The term "pixel value" of a given pixel refers to an overall intensity (namely, brightness) of the given pixel. Notably, the term "overall intensity" of the given pixel has been used to mean any of the following:

an intensity of the given pixel, said intensity being indicated by a single value lying within a minimum intensity value and a maximum intensity value associated with the given pixel, when the given pixel is a pixel of a grayscale image; or an additive intensity of the given pixel, such additive intensity being indicated by a sum of intensity values of different colour channels associated with the given pixel, when the given pixel is a pixel of a colour image.

In an embodiment, a dark lighting condition is estimated in the real-world environment when the pixel values of the pixels within the plurality of sub-segments are darker than the reference pixel values of the corresponding pixels within the reference image. This dark lighting condition may be estimated when actual lighting within the real-world environment is dark, when the plurality of sub-segments lie in a shadow region of a light source in the real-world environment, or similar. In another embodiment, a bright lighting condition is estimated in the real-world environment when the pixel values of the pixels within the plurality of sub-segments are brighter than the reference pixel values of the corresponding pixels within the reference image. This bright lighting condition may be estimated when actual lighting within the real-world environment is bright, when the plurality of sub-segments lie in an illuminated region of a light source in the real-world environment, or similar. It will be appreciated that estimating the lighting conditions (namely, dark lighting conditions and bright lighting conditions) in the aforesaid manner enables generating a highly accurate lighting model of the real-world environment.

Herein, the term "lighting model" refers to a model of lighting conditions in the real-world environment with corresponding locations of the such conditions within the real-world environment. It will be appreciated that when the processor is configured to utilize the lighting model for photorealistically lighting the virtual content, the virtual content is modified (prior to the virtual superimposition) to accurately and realistically represent the lighting conditions in the real-world environment. As an example, the processor may be configured to utilize the lighting model for photorealistically brightening the virtual content corresponding to bright sub-segment(s) within the first image segment, while darkening the virtual content corresponding to dark sub-segment(s) within the first image segment, prior to virtual superimposition.

Optionally, different regions of a material used to implement the coded pattern have different reflectivity, and wherein the processor is further configured to:

analyze the at least one image to determine reflectance values corresponding to the different regions of the material;

estimate an intensity and a direction of at least one light source present in the real-world environment, based on the reflectance values; and generate reflection information indicative of at least one of: the reflectance values corresponding to the different regions, whether or not there exists a variation in the reflectance values across the different regions, the estimated intensity and direction of the at least one light source, wherein, when processing the at least one image to generate the at least one extended-reality image, the processor is configured to utilize the reflection information for photorealistically reflecting light off the virtual content, prior to virtual superimposition.

Optionally, at least one first region of the material used to implement the coded pattern has a low reflectivity or zero reflectivity, while at least one second region of the material used to implement the coded pattern has a high reflectivity. In such a case, reflectance values corresponding to the at least one first region of the material are low or zero, while reflectance values corresponding to the at least one second region of the material are high. As an example, a matte substance having a low reflectivity may be employed for the at least one first region of the material, while a glossy substance having a high reflectivity may be employed for the at least one second region of the material.

Optionally, a given reflectance value is determined based on pixel values of pixels representing a given region of the material in the at least one image. When the pixel values of pixels corresponding to the given region of the material are low (i.e. low intensity values are associated with such pixels), the given reflectance value is low, and when the pixel values of pixels corresponding to the given region of the material are high (i.e. high intensity values are associated with such pixels), the given reflectance value is high. Optionally, the given reflectance value lies in a range of 0 to 1. Here, 0 indicates lowest reflectance value (or zero/no reflectivity of the given region of the material), while 1 indicates highest reflectance value (or highest reflectivity of the given region of the material). For example, the given reflectance value may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Alternatively, optionally, the given reflectance value lies in a range of 0 to 100. Here, 0 indicates lowest reflectance value, while 100 indicates highest reflectance value. For example, the given reflectance value may be from 0, 10, 20, 30, 40, 50, 60, 70, 80, or 90 up to 10, 20, 30, 40, 50, 60, 70, 80, 90 or 100. It will be appreciated that the given reflectance value is optionally expressed as percentage. In an example, the given reflectance value for the matte substance may be 0.25, while the given reflectance value for the glossy substance may be 0.85.

Optionally, the intensity of the at least one light source present in the real-world environment is estimated according to the reflectance values such that a high reflectance value corresponds to a high intensity of the at least one light source, and a low reflectance value corresponds to a low intensity of the at least one light source. Optionally, the direction of the at least one light source present in the real-world environment is estimated based on variations in reflectance values across the different regions of the material.

The term "reflection information" refers to information that describes how reflection of light (emitted by the at least one light source present in the real-world environment) occurs from the material used to implement the coded pattern. It will be appreciated that the reflection information generated in the aforesaid manner is highly accurate. It will also be appreciated that when the processor is configured to utilize the reflection information for photorealistically reflecting the light off the virtual content, the virtual content is modified (prior to the virtual superimposition) for accurately and realistically emulating a manner in which light would be reflected off the virtual content if the virtual content was actually present in the real-world environment. The virtual superimposition of the virtual content would look unrealistic and bland without utilizing the reflection information. Moreover, other ways of generating the reflection information are also possible.

Optionally, the processor is further configured to determine a sound effect that is to be provided when rendering the at least one extended-reality image at the display apparatus. Optionally, in this regard, the processor is configured to determine the sound effect based on at least one of: the type of the test object, a composition of the test object, parts of the test object. Optionally, the processor is configured to obtain the sound effect from the data repository, wherein the data repository is configured to store a plurality of sound effects pertaining to the plurality of test objects. Optionally, the sound effect is provided via speaker(s) of the display apparatus. As example, the processor may determine that an artificial sound effect of bending and crunching is to be provided when rendering the at least one XR image that represents a user deforming a pack of candies, at the display apparatus.

For illustration purposes only, there will now be described an example implementation of the system for producing XR images for the display apparatus. In such an implementation, a user of the display apparatus sets up test objects in a research laboratory, wherein the test objects are physically covered three-dimensionally with the coded pattern. The processor performs the aforesaid processing steps to generate XR images, in which the virtual content is virtually superimposed in a photorealistic manner over the part of the coded pattern of the test objects. The user can now easily view and/or handle the test objects (upon which the virtual content is virtually photorealistically superimposed), to evaluate how the test objects would appear and/or be handled when the virtual content is actually (i.e. in reality) provided upon the test object. As an example, multiple virtual content may be generated to represent multiple brands of the test object over a surface of the test object. In such a case, using the aforementioned system, the multiple virtual content corresponding to the multiple brands could be virtually superimposed over the surface of the test object to generate multiple XR images for the display apparatus. In this manner, the user of the display apparatus could observe and evaluate how representation of the multiple brands would appear on the test object, in reality. Beneficially, the user need not to generate multiple prototypes of the test object with the multiple brands. Thus, an ease of consumer research is appreciably increased at minimal cost and time.

The present disclosure also relates to the method as described above. Various embodiments and variants disclosed above, with respect to the aforementioned first aspect, apply mutatis mutandis to the method.

Optionally, the method further comprises creating a three-dimensional data representation of the test object indicative of at least one of: the three-dimensional geometry of the coded pattern, a pose of the coded pattern, using the at least one image,
wherein the step of processing the at least one image to generate the at least one extended-reality image is performed by utilizing the three-dimensional data representation of the test object for realistic three-dimensional virtual superimposition of the virtual content.

Optionally, the method further comprises:
analyzing the at least one image to identify a second image segment representing a part of a user's body; and
determining a relative arrangement of the first image segment and the second image segment in the at least one image, wherein, the step of processing the at least one image to generate the at least one extended-reality image comprises:
modifying the virtual content to be virtually superimposed, based on the relative arrangement of the first image segment and the second image segment; and
replacing the first image segment with the modified virtual content.

Optionally, the method further comprises:
selecting a plurality of sub-segments within the first image segment;
analyzing the at least one image to determine pixel values of pixels within the plurality of sub-segments;
estimating lighting conditions in the real-world environment by comparing the pixel values of the pixels within the plurality of sub-segments with reference pixel values of corresponding pixels within a reference image, wherein the reference image represents a reference pattern that is used to generate the coded pattern; and
generating a lighting model of the real-world environment using the estimated lighting conditions in the real-world environment,
wherein the step of processing the at least one image to generate the at least one extended-reality image is performed by utilizing the lighting model for photorealistically lighting the virtual content, prior to virtual superimposition.

Optionally, different regions of a material used to implement the coded pattern have different reflectivity, and wherein the method further comprises:
analyzing the at least one image to determine reflectance values corresponding to the different regions of the material;
estimating an intensity and a direction of at least one light source present in the real-world environment, based on the reflectance values; and
generating reflection information indicative of at least one of: the reflectance values corresponding to the different regions, whether or not there exists a variation in the reflectance values across the different regions, the estimated intensity and direction of the at least one light source,
wherein the step of processing the at least one image to generate the at least one extended-reality image is performed by utilizing the reflection information for photorealistically reflecting light off the virtual content, prior to virtual superimposition.

Optionally, the method further comprises:

generating a plurality of pattern images having different sizes using at least one reference pattern;

resizing the plurality of pattern images in a manner that upon resizing, the plurality of pattern images have a same size and correspond to different scales of the at least one reference pattern; and joining the plurality of pattern images to generate the coded pattern.

Optionally, in the method, the step of analyzing the at least one image to identify the first image segment comprises:

extracting a plurality of first features from the at least one image;

extracting a plurality of second features from at least one reference image representing at least one reference pattern, wherein the coded pattern is generated using the at least one reference pattern; and matching the plurality of first features with the plurality of second features to detect the coded pattern in the at least one image.

Optionally, in the method, different surfaces of the test object are covered with different types of the coded pattern that are generated using different reference images representing different reference patterns, wherein the step of analyzing the at least one image to identify the first image segment comprises:

detecting at least one type of the coded pattern that is visible in the at least one image; and determining at least one surface of the test object that is visible in the at least one image, based on the at least one type of the coded pattern.

Optionally, the method further comprises determining a sound effect that is to be provided when rendering the at least one extended-reality image at the display apparatus.

DETAILED DESCRIPTION OF THE DRAWINGS

Referring to FIG. 1, illustrated is a block diagram of architecture of a system 100 for producing extended-reality images for a display apparatus 102, in accordance with an embodiment of the present disclosure. The system 100 comprises at least one camera (depicted as a camera 104) and a processor 106 communicably coupled to the camera 104.

It may be understood by a person skilled in the art that the FIG. 1 includes a simplified architecture of the system 100 for sake of clarity, which should not unduly limit the scope of the claims herein. The person skilled in the art will recognize many variations, alternatives, and modifications of embodiments of the present disclosure.

Figure 2A:
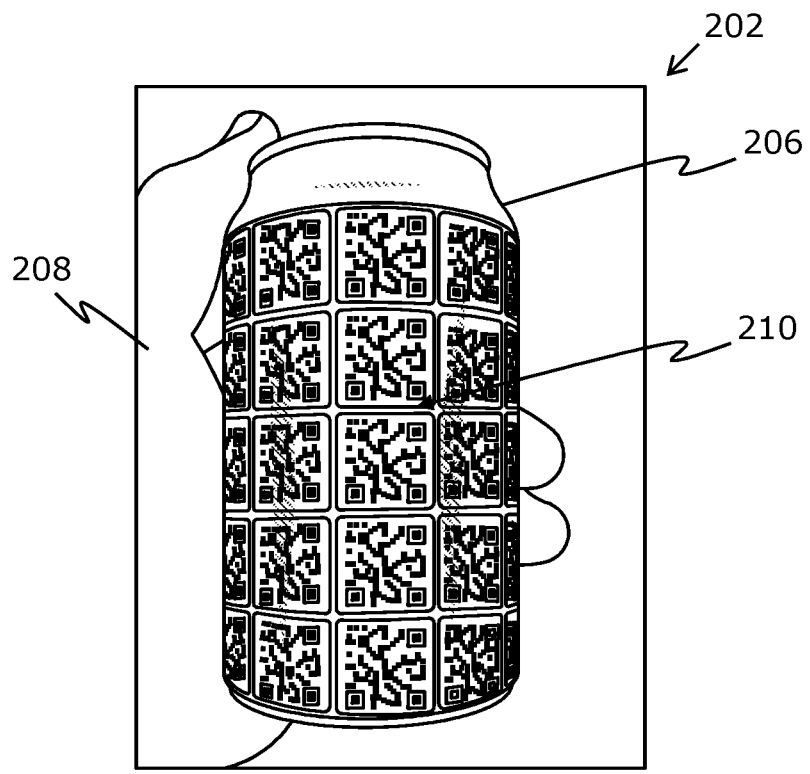
Figure 2B:
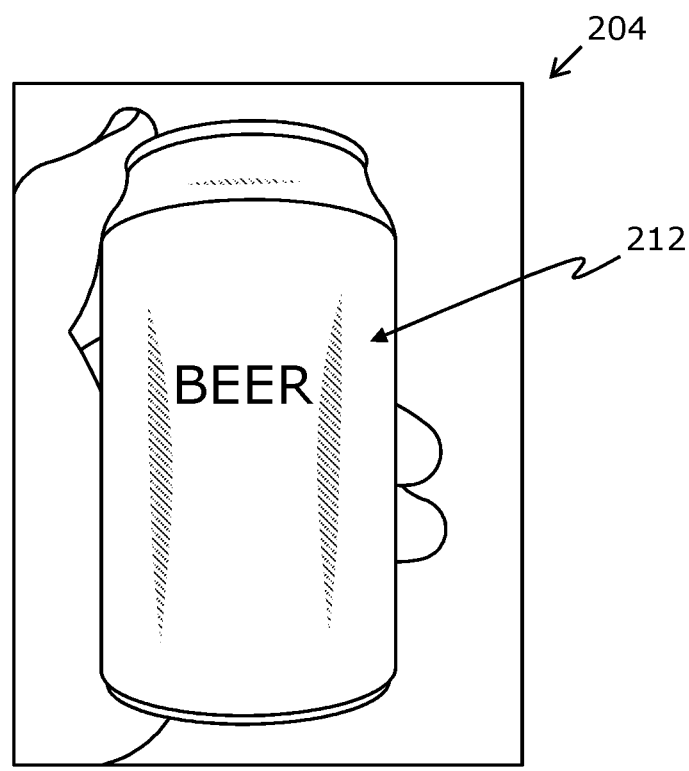
FIG. 2B illustrates an exemplary first extended-reality image, in accordance with an embodiment of the present disclosure.

Referring to FIGS. 2A and 2B, FIG. 2A illustrates an exemplary first image 202, while FIG. 2B illustrates an exemplary first extended-reality image 204, in accordance with an embodiment of the present disclosure.

The first image 202 of FIG. 2A is captured by at least one camera (not shown). As shown, the first image 202 represents a test object 206 present in a real-world environment, wherein the test object 206 is simply held by a part 208 (for example, a hand) of a user's body. The test object 206 represents, for example, a can. The test object 206 is physically covered three-dimensionally with a coded pattern 210, and only a part of the coded pattern 210 is visible in the first image 202. Herein, a relative arrangement between the test object 206 and the part 208 (hand) of the user's body is such that an entire part of the coded pattern 210 is visible in the first image 202 when the test object 206 is simply held by the part 208 (hand) of the user's body.

In FIG. 2B, the first extended-reality image 204 is generated by processing the first image 202 (in FIG. 2A), wherein virtual content 212 is virtually superimposed over the part of the coded pattern 210 (in FIG. 2A) that is visible in the first image 202. Herein, the virtual content 212 is indicative of a type of the test object 206. When the first image 202 is processed to generate the first extended-reality image 204, reflection information is utilized for photorealistically reflecting light off the virtual content, prior to virtual superimposition. This photorealistic reflection of light is depicted as hatched shading.

Figure 3A:
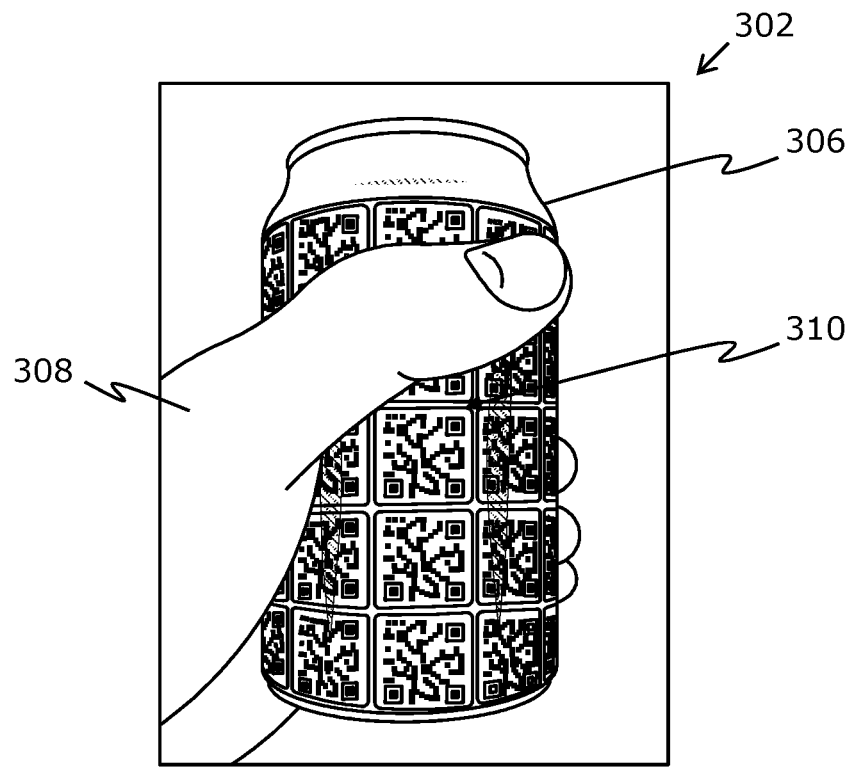
Figure 3B:
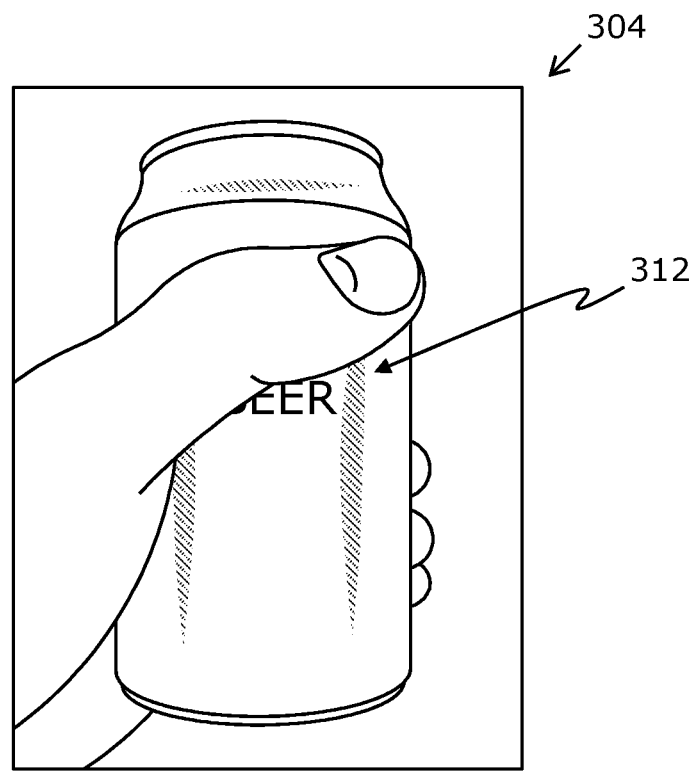
FIG. 3B illustrates an exemplary second extended-reality image, in accordance with an embodiment of the present disclosure.

Referring to FIGS. 3A and 3B, FIG. 3A illustrates an exemplary second image 302, while FIG. 2B illustrates an exemplary second extended-reality image 304, in accordance with an embodiment of the present disclosure.

The second image 302 of FIG. 3A is captured by at least one camera (not shown). As shown, the second image 302 represents a test object 306 present in a real-world environment, wherein the test object 306 is firmly held by a part 308 (for example, a hand) of a user's body. The test object 306 represents, for example, a front side of a can. The test object 306 is physically covered three-dimensionally with a coded pattern 310, and only a part of the coded pattern 310 is visible in the second image 302. Herein, a relative arrangement between the test object 306 and the part 308 (hand) of the user's body is such that some portion of the part of the coded pattern 310 that is visible in the second image 302 is partially occluded by the part 308 of the user's body in the second image 302 when the test object 306 is gripped by the part 308 of the user's body.

In FIG. 3B, the second extended-reality image 304 is generated by processing the second image 302 (in FIG. 3A), wherein virtual content 312 is virtually superimposed over the part of the coded pattern 310 (in FIG. 3A) that is visible in the image 302. Herein, the virtual content 312 is indicative of a type of the test object 306. When the second image 302 is processed to generate the second extended-reality image 304, the virtual content 312 is modified, based on a relative arrangement of a first image segment representing the part of the coded pattern 310 that is visible in the second image 302 and a second image segment representing the part 308 (hand) of the user's body. As shown, a part of virtual text indicating the type of the test object 306 is cropped to modify the virtual content 312. Then, the first image segment is replaced with the modified virtual content. Moreover, photorealistic reflection of light off the modified virtual content is depicted as hatched shading.

Figure 4A:
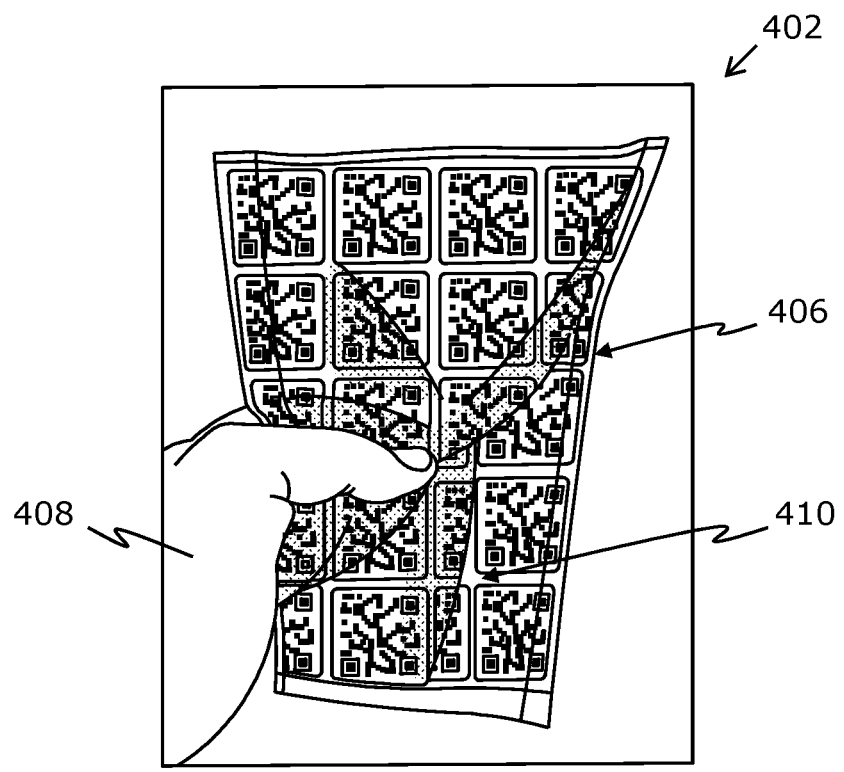
Figure 4B:
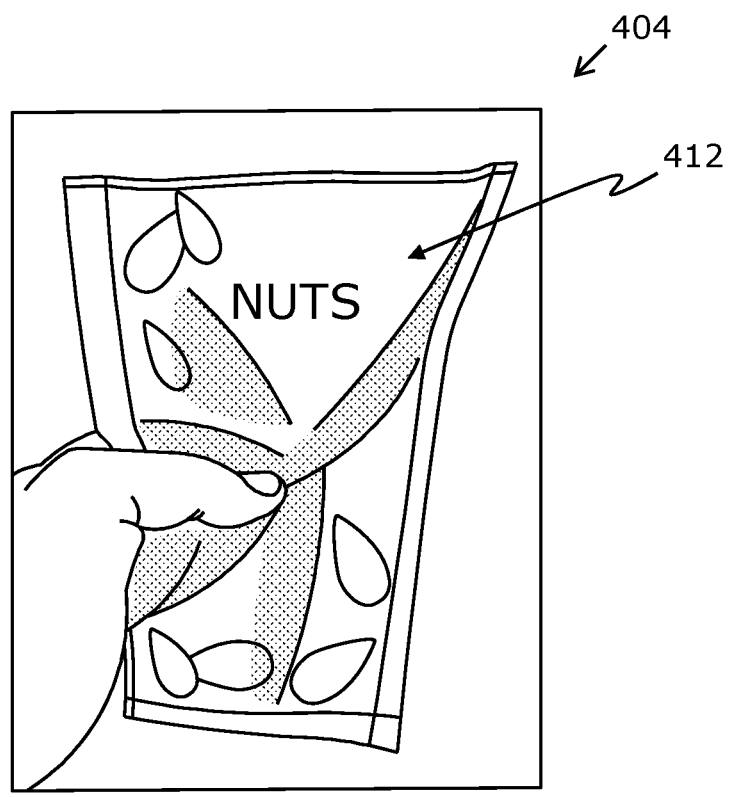
FIG. 4B illustrates an exemplary third extended-reality image, in accordance with an embodiment of the present disclosure.

Referring to FIGS. 4A and 4B, FIG. 4A illustrates an exemplary third image 402, while FIG. 4B illustrates an exemplary third extended-reality image 404, in accordance with an embodiment of the present disclosure.

The third image 402 of FIG. 4A is captured by the at least one camera (not shown). As shown, the third image 402 represents a test object 406 present in a real-world environment, wherein the test object 406 is pressed or crushed by a part 408 (for example, a hand) of a user's body. The test object 406 represents, for example, a front side of a pack of nuts. The test object 406 is physically covered three-dimensionally with a coded pattern 410, and only a part of the coded pattern 410 is visible in the third image 402. Herein, a relative arrangement between the test object 406 and the part 408 (hand) of the user's body is such that the part of the coded pattern 410 that is visible in the third image 402 is partially occluded by the part 408 of the user's body in the third image 402 when the test object 406 is pressed or crushed by the part 408 of the user's body.

In FIG. 4B, the third extended-reality image 404 is generated by processing the third image 402 (in FIG. 4A), wherein virtual content 412 is virtually superimposed over the part of the coded pattern 410 (in FIG. 4A) that is visible in the third image 402. Herein, the virtual content 412 is indicative of a type of the test object 406 and an image of the test object 406 (depicted as drop-shaped nuts such as almonds). When the third image 402 is processed to generate the third extended-reality image 404, a lighting model of the real-world environment is utilized for photorealistically lighting the virtual content 412, prior to virtual superimposition. For example, in the virtual content 412, nuts that lie in shadow regions (depicted as dotted hatching) of the test object 406 may be darker in colour as compared to nuts in other regions of the test object.

It may be understood by a person skilled in the art that the FIGS. 2A, 2B, 3A, 3B, 4A, and 4B are merely examples for the sake of clarity, which should not unduly limit the scope of the claims herein. The person skilled in the art will recognize many variations, alternatives, and modifications of embodiments of the present disclosure.

Figure 5:
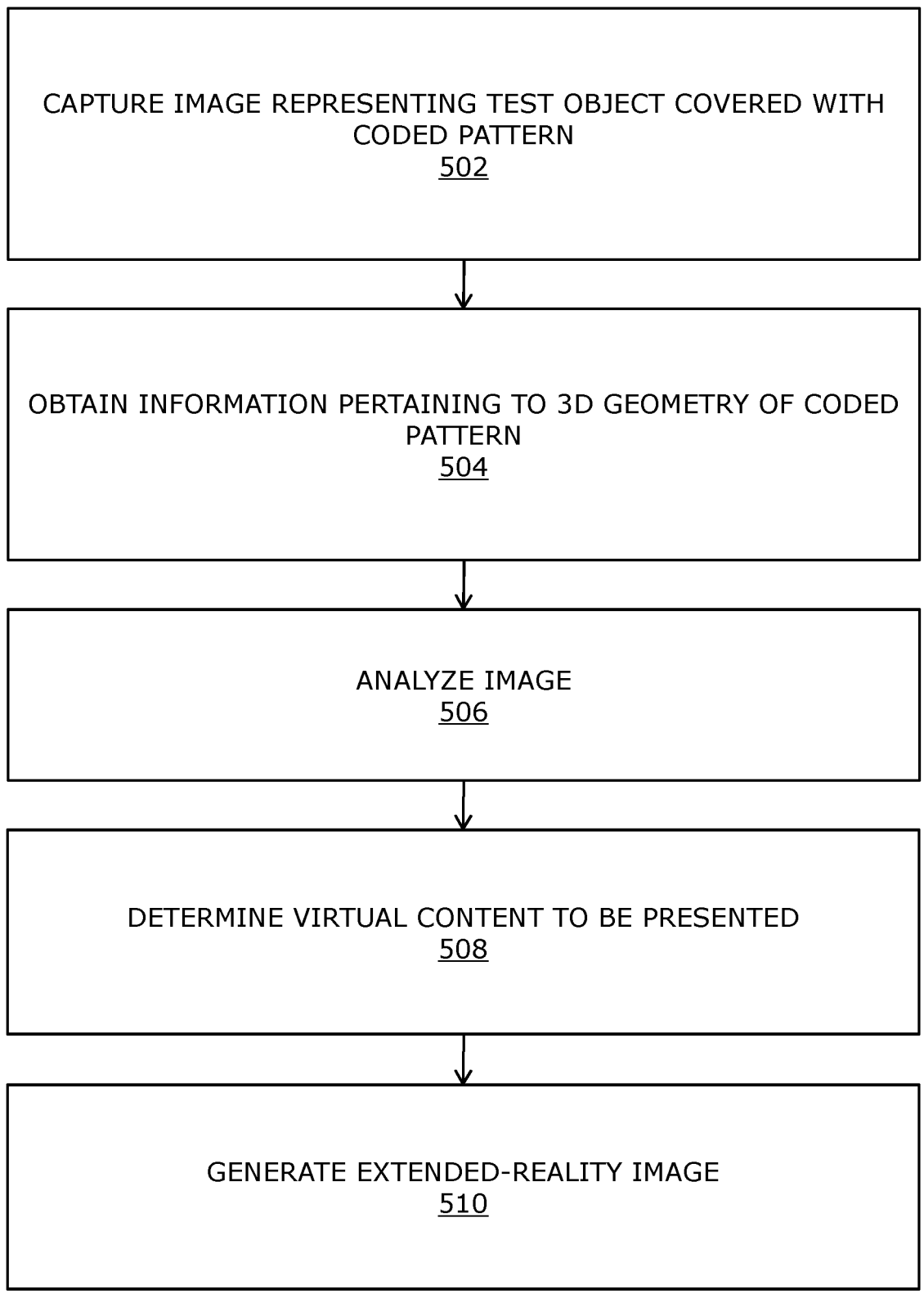
FIG. 5 illustrates steps of a method of displaying via a display apparatus, in accordance with an embodiment of the present disclosure.

Referring to FIG. 5, illustrated are steps of a method for producing extended-reality images for a display apparatus, in accordance with an embodiment of the present disclosure. At step 502, at least one camera is controlled to capture at least one image representing a test object present in a real-world environment, wherein the test object is physically covered three-dimensionally with a coded pattern. At step 504, information pertaining to a three-dimensional geometry of the coded pattern covering the test object is obtained. At step 506, the at least one image is analyzed to identify a first image segment representing a part of the coded pattern that is visible in the at least one image. At step 508, virtual content to be presented for the test object is determined, based on the part of the coded pattern that is visible in the at least one image. At step 510, the at least one image is processed to generate at least one extended-reality image in which the virtual content is virtually superimposed over the part of the coded pattern represented in the first image segment, based on the information pertaining to the three-dimensional geometry of the coded pattern.

The steps 502, 504, 506, 508, and 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for producing extended-reality images for a display apparatus, the system comprising at least one camera and a processor communicably coupled to the at least one camera, wherein the processor is configured to:

control the at least one camera to capture at least one image representing a test object present in a real-world environment, wherein the test object is physically covered three-dimensionally with a coded pattern;

obtain information pertaining to a three-dimensional geometry of the coded pattern covering the test object;

analyze the at least one image to identify a first image segment representing a part of the coded pattern that is visible in the at least one image;

determine virtual content to be presented for the test object, based on the part of the coded pattern that is visible in the at least one image; and process the at least one image to generate at least one extended-reality image in which the virtual content is virtually superimposed over the part of the coded pattern represented in the first image segment, based on the information pertaining to the three-dimensional geometry of the coded pattern.

2. The system of claim 1, wherein the processor is further configured to create a three-dimensional data representation of the test object indicative of at least one of: the three-dimensional geometry of the coded pattern, a pose of the coded pattern, using the at least one image, wherein when processing the at least one image to generate the at least one extended-reality image, the processor is configured to utilize the three-dimensional data representation of the test object for realistic three-dimensional virtual superimposition of the virtual content.

3. The system of claim 1, wherein the processor is further configured to:

analyze the at least one image to identify a second image segment representing a part of a user's body; and determine a relative arrangement of the first image segment and the second image segment in the at least one image, wherein, when processing the at least one image to generate the at least one extended-reality image, the processor is configured to:

modify the virtual content to be virtually superimposed, based on the relative arrangement of the first image segment and the second image segment; and replace the first image segment with the modified virtual content.

4. The system of claim 1, wherein the processor is further configured to:

select a plurality of sub-segments within the first image segment;

analyze the at least one image to determine pixel values of pixels within the plurality of sub-segments;

estimate lighting conditions in the real-world environment by comparing the pixel values of the pixels within the plurality of sub-segments with reference pixel values of corresponding pixels within a reference image, wherein the reference image represents a reference pattern that is used to generate the coded pattern; and generate a lighting model of the real-world environment using the estimated lighting conditions in the real-world environment, wherein, when processing the at least one image to generate the at least one extended-reality image, the processor is configured to utilize the lighting model for photorealistically lighting the virtual content, prior to virtual superimposition.

5. The system of claim 1, wherein different regions of a material used to implement the coded pattern have different reflectivity, and wherein the processor is further configured to:

analyze the at least one image to determine reflectance values corresponding to the different regions of the material;

estimate an intensity and a direction of at least one light source present in the real-world environment, based on the reflectance values; and generate reflection information indicative of at least one of: the reflectance values corresponding to the different regions, whether or not there exists a variation in the reflectance values across the different regions, the estimated intensity and direction of the at least one light source, wherein, when processing the at least one image to generate the at least one extended-reality image, the processor is configured to utilize the reflection information for photorealistically reflecting light off the virtual content, prior to virtual superimposition.

6. The system of claim 1, wherein the processor is further configured to:

generate a plurality of pattern images having different sizes using at least one reference pattern;

resize the plurality of pattern images in a manner that upon resizing, the plurality of pattern images have a same size and correspond to different scales of the at least one reference pattern; and join the plurality of pattern images to generate the coded pattern.

7. The system of claim 1, wherein when analyzing the at least one image to identify the first image segment, the processor is configured to:

extract a plurality of first features from the at least one image;

extract a plurality of second features from at least one reference image representing at least one reference pattern, wherein the coded pattern is generated using the at least one reference pattern; and match the plurality of first features with the plurality of second features to detect the coded pattern in the at least one image.

8. The system of claim 1, wherein different surfaces of the test object are covered with different types of the coded pattern that are generated using different reference images representing different reference patterns, wherein, when analyzing the at least one image to identify the first image segment, the processor is configured to:

detect at least one type of the coded pattern that is visible in the at least one image; and determine at least one surface of the test object that is visible in the at least one image, based on the at least one type of the coded pattern.

9. The system of claim 1, wherein the processor is further configured to determine a sound effect that is to be provided when rendering the at least one extended-reality image at the display apparatus.

10. A method for producing extended-reality images for a display apparatus, the method comprising:

controlling at least one camera to capture at least one image representing a test object present in a real-world environment, wherein the test object is physically covered three-dimensionally with a coded pattern;

obtaining information pertaining to a three-dimensional geometry of the coded pattern covering the test object;

analyzing the at least one image to identify a first image segment representing a part of the coded pattern that is visible in the at least one image;

determining virtual content to be presented for the test object, based on the part of the coded pattern that is visible in the at least one image; and processing the at least one image to generate at least one extended-reality image in which the virtual content is virtually superimposed over the part of the coded pattern represented in the first image segment, based on the information pertaining to the three-dimensional geometry of the coded pattern.

11. The method of claim 10, wherein the method further comprises creating a three-dimensional data representation of the test object indicative of at least one of: the three-dimensional geometry of the coded pattern, a pose of the coded pattern, using the at least one image, wherein the step of processing the at least one image to generate the at least one extended-reality image is performed by utilizing the three-dimensional data representation of the test object for realistic three-dimensional virtual superimposition of the virtual content.

12. The method of claim 10, wherein the method further comprises:

analyzing the at least one image to identify a second image segment representing a part of a user's body; and determining a relative arrangement of the first image segment and the second image segment in the at least one image, wherein, the step of processing the at least one image to generate the at least one extended-reality image comprises:

modifying the virtual content to be virtually superimposed, based on the relative arrangement of the first image segment and the second image segment; and replacing the first image segment with the modified virtual content.

13. The method of claim 10, wherein the method further comprises:

selecting a plurality of sub-segments within the first image segment;

analyzing the at least one image to determine pixel values of pixels within the plurality of sub-segments;

estimating lighting conditions in the real-world environment by comparing the pixel values of the pixels within the plurality of sub-segments with reference pixel values of corresponding pixels within a reference image, wherein the reference image represents a reference pattern that is used to generate the coded pattern; and generating a lighting model of the real-world environment using the estimated lighting conditions in the real-world environment, wherein the step of processing the at least one image to generate the at least one extended-reality image is performed by utilizing the lighting model for photorealistically lighting the virtual content, prior to virtual superimposition.

14. The method of 10, wherein different regions of a material used to implement the coded pattern have different reflectivity, and wherein the method further comprises:

analyzing the at least one image to determine reflectance values corresponding to the different regions of the material;

estimating an intensity and a direction of at least one light source present in the real-world environment, based on the reflectance values; and generating reflection information indicative of at least one of: the reflectance values corresponding to the different regions, whether or not there exists a variation in the reflectance values across the different regions, the estimated intensity and direction of the at least one light source, wherein the step of processing the at least one image to generate the at least one extended-reality image is performed by utilizing the reflection information for photorealistically reflecting light off the virtual content, prior to virtual superimposition.

15. The method of claim 10, further comprising:
   generating a plurality of pattern images having different sizes using at least one reference pattern;
   resizing the plurality of pattern images in a manner that upon resizing, the plurality of pattern images have a same size and correspond to different scales of the at least one reference pattern; and
   joining the plurality of pattern images to generate the coded pattern.

16. The method of claim 10, wherein the step of analyzing the at least one image to identify the first image segment comprises:
   extracting a plurality of first features from the at least one image;
   extracting a plurality of second features from at least one reference image representing at least one reference pattern, wherein the coded pattern is generated using the at least one reference pattern; and
   matching the plurality of first features with the plurality of second features to detect the coded pattern in the at least one image.

17. The method of claim 10, wherein different surfaces of the test object are covered with different types of the coded pattern that are generated using different reference images representing different reference patterns,
   wherein the step of analyzing the at least one image to identify the first image segment comprises:
      detecting at least one type of the coded pattern that is visible in the at least one image; and
      determining at least one surface of the test object that is visible in the at least one image, based on the at least one type of the coded pattern.

18. The method of claim 10, further comprising determining a sound effect that is to be provided when rendering the at least one extended-reality image at the display apparatus.

* * * * *